(No Model.)

C. HENDRIE.
Coffee Roaster.

No. 237,018.            Patented Jan. 25, 1881.

Witnesses
Wm. W. Mortimer
A. C. Kirkadden

Inventor:
Chas. Hendrie,
per
F. A. Lehmann,
Atty

UNITED STATES PATENT OFFICE.

CHARLES HENDRIE, OF ROCKPORT, KENTUCKY.

COFFEE-ROASTER.

SPECIFICATION forming part of Letters Patent No. 237,018, dated January 25, 1881.

Application filed November 2, 1880. (No model.)

*To all whom it may concern:*

Be it known that I, CHARLES HENDRIE, of Rockport, in the county of Ohio and State of Kentucky, have invented certain new and useful Improvements in Coffee-Roasters; and I do hereby declare the following to be a full, clear, and exact description of the invention, such as will enable others skilled in the art to which it pertains to make and use it, reference being had to the accompanying drawings, which form part of this specification.

My invention relates to an improvement in coffee-roasters; and it consists in the combination of an outer casing, which sits over one of the openings of the stove, and has an opening through its bottom, so as to admit heat through its interior, and two revolving cylinders, one of which is placed inside of the other, and which two cylinders are placed inside of the outer casing, as will be more fully described hereinafter.

The object of my invention is to protect the inner cylinder, in which the coffee is placed to be roasted, from the direct action of the fire, and to have both cylinders revolve, so that the outer one will not receive the heat always upon the same spot, and thus prevent the outer cylinder from being so soon destroyed.

Figure 1:
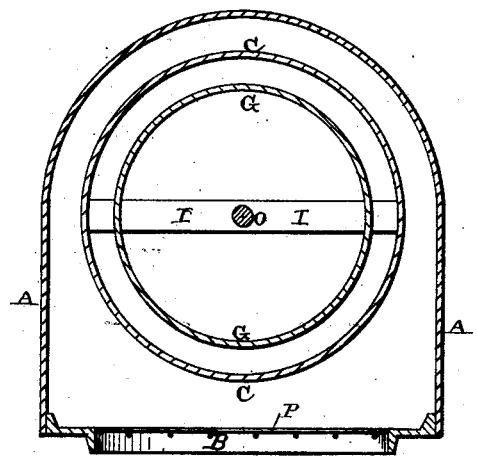
Figure 2:
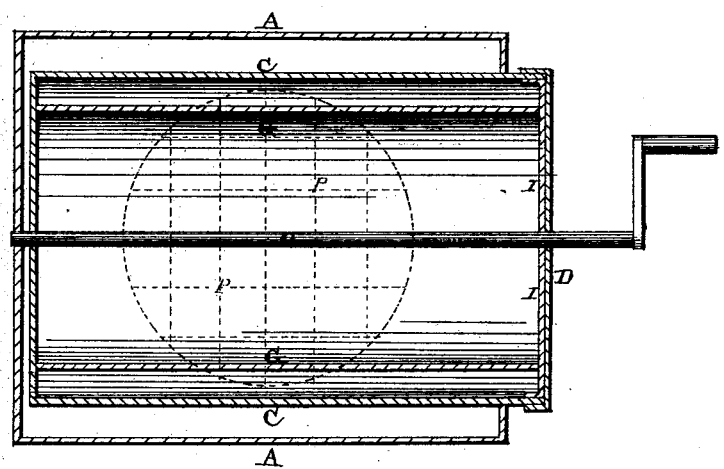

Figure 1 is a vertical section of an apparatus embodying my invention. Fig. 2 is a longitudinal section of the same.

A represents a sheet-metal casing or frame, which may be of any desired shape, size, or construction preferred, and which is secured at its lower edge to the flanged iron plate or casting B, which rests upon the stove, over the top of one of the holes, and which plates or casting B has a hole through its center, so as to allow the heat from the fire to pass up into the interior of the casing A. This plate B has a flange formed all around its outer edge, so as to secure the frame A to it, and has a flange formed on its under side, so as to catch inside of the hole of the stove and prevent the frame from being moved. To the top of this frame A is secured a suitable handle, of any desired construction, for the purpose of carrying the roaster around. Across the opening in the bottom of the frame may be stretched a net-work of wires, P, as shown in dotted lines in Fig. 2, so as to prevent coals of fire from getting into the frame. Passed through the end of this casing or frame A is the revolving outer cylinder, C, which has its inner end closed and its outer end open, but provided with the removable cover D. This open end of the cylinder C projects far enough beyond the opening in the frame A to allow the cover to be fastened on in any suitable manner. Placed inside of this outer cylinder is a small cylinder, G, which revolves with the outer one, and which has its inner end closed by the inner end of the outer cylinder, C, and its outer end by the cover D.

Passed through the cover D, the cross-bar I, which extends across the end of the inner cylinder, through the center of the two cylinders and the rear end of the frame A, is the shaft O, which has a crank formed on its outer end, and by means of which the two cylinders are made to revolve.

The two cylinders are connected together so as to be practically one, and the outer one serves to prevent the direct heat of the fire from coming in contact with the inner cylinder, in which the coffee is placed. After the coffee has been roasted, both cylinders are drawn out of the frame A by means of the shaft, and the coffee is removed by taking off the cover D.

Where the outer cylinder or casing, in which the inner cylinder is placed, is stationary, the heat of the fire is applied always to its under side, and hence this outer cylinder is soon burned through, and then becomes of no further use; but where this cylinder is kept constantly revolving the heat is applied to all parts alike, and hence will last indefinitely. By revolving the inner cylinder the heat is applied evenly to the coffee that is being roasted, and hence it can never become burned or roasted unevenly.

I am aware that it is not new to inclose the cylinder in which the coffee is placed to be roasted in a stationary outer frame or casing to which the heat of the fire is applied direct, but always in the same place, and this I disclaim.

Having thus described my invention, I claim—

In a coffee-roaster, the combination of the sheet-metal frame A, iron base B, having a series of wires, P, stretched across its opening, the two cylinders G C, secured to the same shaft and closed by the same cover D, the parts being arranged for operation substantially as shown and described.

In testimony that I claim the foregoing I have hereunto set my hand this 1st day of September, 1880.

CHARLES HENDRIE.

Witnesses:
Z. W. SCHULTZ,
J. A. WOODBURN.